(12) United States Patent
Yanagiguchi et al.

(10) Patent No.: US 9,663,638 B2
(45) Date of Patent: May 30, 2017

(54) ACRYLONITRILE BUTADIENE RUBBER COMPOSITION, ACRYLONITRILE BUTADIENE RUBBER MOLDED ARTICLE, AND METHOD FOR PRODUCING SAME

(71) Applicant: DAIKIN INDUSTRIES, LTD., Osaka-shi, Osaka (JP)

(72) Inventors: Tomihiko Yanagiguchi, Settsu (JP); Haruhisa Masuda, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/771,122

(22) PCT Filed: Feb. 28, 2014

(86) PCT No.: PCT/JP2014/055043
§ 371 (c)(1),
(2) Date: Aug. 27, 2015

(87) PCT Pub. No.: WO2014/136668
PCT Pub. Date: Sep. 12, 2014

(65) Prior Publication Data
US 2016/0002447 A1    Jan. 7, 2016

(30) Foreign Application Priority Data

Mar. 5, 2013    (JP) ................. 2013-043299

(51) Int. Cl.
*C08L 9/00*    (2006.01)
*C08L 9/02*    (2006.01)
*C08J 5/00*    (2006.01)

(52) U.S. Cl.
CPC . *C08L 9/02* (2013.01); *C08J 5/00* (2013.01); *C08J 2309/02* (2013.01); *C08J 2327/18* (2013.01); *C08L 2201/02* (2013.01)

(58) Field of Classification Search
CPC ........ C08L 9/02; C08L 27/18; C08L 2201/02; C08J 5/00; C08J 2327/18; C08J 1309/02
See application file for complete search history.

(56) References Cited

U.S. PATENT DOCUMENTS

| | | | | |
|---|---|---|---|---|
| 3,940,455 | A | * 2/1976 | Kaufman | ............... C06B 45/10 525/197 |
| 4,579,906 | A | * 4/1986 | Zabrocki et al. | ........ C08J 3/005 524/411 |
| 2007/0225430 | A1 | 9/2007 | Masuda et al. | |
| 2010/0247913 | A1 | 9/2010 | Nakagawa et al. | |

FOREIGN PATENT DOCUMENTS

| | | |
|---|---|---|
| JP | 45-3940 B1 | 2/1970 |
| JP | 2651709 B2 | 9/1997 |
| JP | 3017257 B2 | 3/2000 |
| JP | 2003-96438 A | 4/2003 |
| WO | 2005/111140 A1 | 11/2005 |
| WO | 2008/142983 A1 | 11/2008 |

OTHER PUBLICATIONS

International Search Report of PCT/JP2014/055043, dated Mar. 25, 2014. [PCT/ISA/210].
Abstract and Machine Translation of JP 45-3940, which was cited in the IDS filed on Aug. 27, 2015.
Machine Translation of JP 2003-96438, which was cited in the IDS filed on Aug. 27, 2015.
International Preliminary Report on Patentability issued by the International Searching Authority in counterpart International application No. PCT/JP2014/055043, issued on Sep. 8, 2015.
Communication dated Sep. 21, 2016 from the European Patent Office in counterpart application No. 14760528.1.

* cited by examiner

*Primary Examiner* — Nathan M Nutter
(74) *Attorney, Agent, or Firm* — Sughrue Mion, PLLC (57) ABSTRACT

An object of the present invention is to provide an acrylonitrile-butadiene rubber composition that can provide an acrylonitrile-butadiene rubber molded article having excellent properties of non-stickiness, oil resistance, heat resistance, and low-friction properties. The acrylonitrile-butadiene rubber composition of the present invention includes: an acrylonitrile-butadiene rubber (A); and a fluororesin (B), the fluororesin (B) being a perhalopolymer, the composition formed from a co-coagulated composition obtainable by co-coagulating the acrylonitrile-butadiene rubber (A) and the fluororesin (B).

6 Claims, 1 Drawing Sheet

ACRYLONITRILE BUTADIENE RUBBER COMPOSITION, ACRYLONITRILE BUTADIENE RUBBER MOLDED ARTICLE, AND METHOD FOR PRODUCING SAME

CROSS REFERENCE TO RELATED APPLICATIONS

This application is a National Stage of International Application No. PCT/JP2014/055043 filed Feb. 28, 2014, claiming priority based on Japanese Patent Application No. 2013-043299, filed Mar. 5, 2013, the contents of all of which are incorporated herein by reference in their entirety.

TECHNICAL FIELD

The present invention relates to an acrylonitrile-butadiene rubber composition, an acrylonitrile-butadiene rubber molded article obtained by crosslinking the composition, and a method for producing the molded article.

BACKGROUND ART

Acrylonitrile-butadiene rubbers are known as rubbers having favorable properties of oil resistance, abrasion resistance, and aging resistance, and are used for, for example, oil-resistant products such as oil seals, gaskets, oil-resistant hoses, conveyor belts, printing rolls, and top rolls for spinning. Acrylonitrile-butadiene rubbers, however, are inferior in properties such as non-stickiness and heat resistance, and are thus desired to be improved in some uses.

Meanwhile, fluororesins have excellent properties such as slidability, heat resistance, chemical resistance, solvent resistance, weather resistance, flexibility, electric properties, and non-stickiness, and are thus used in broad fields such as automobiles, industrial machines, OA equipment, and electrical and electronic equipment. Fluororesins have particularly excellent slidability, and have a low friction coefficient which is outstanding among the resins. Fluororesins, however, are inferior to crystalline heat resistant thermoplastic resins in terms of physical properties such as mechanical properties and load deflection temperature in many cases, and are therefore limited in their use.

One way to deal with this problem is improving these properties by combination use of the rubber and the resin.

For example, Patent Literature 1 discloses an oil seal including a low-stickiness elastic coating layer that is formed by dissolving as a main component an unvulcanized fluororubber, an unvulcanized acrylic rubber, or an unvulcanized nitrile rubber, and applying an organic solvent-type rubber cement in which fluororesin powder is dispersed.

Patent Literature 2 discloses a lubricating rubber composition obtained by mixing a diene-based rubber, a thermoplastic fluororesin, and a low molecular weight fluoropolymer having an average molecular weight of 50000 or lower.

Patent Literature 3 discloses a thermoplastic polymer composition formed from a fluororesin (A) and a non-fluorinated crosslinked rubber (B), wherein the fluororesin (A) contains a fluoroethylenic polymer (a), and the non-fluorine crosslinked rubber (B) is obtained by crosslinking at least part of at least one rubber (b).

CITATION LIST

Patent Literature

Patent Literature 1: JP 2651709 B
Patent Literature 2: JP 3017257 B
Patent Literature 3: WO 2005/111140

SUMMARY OF INVENTION

Technical Problem

An object of the present invention is to provide an acrylonitrile-butadiene rubber composition that can provide a molded article with excellent properties of non-stickiness, oil resistance, heat resistance, and low-friction properties; a molded article obtained by crosslinking the composition; and a method for producing the molded article.

Solution to Problem

The present inventors have made intensive studies on rubber compositions that can provide a molded article with excellent properties of non-stickiness, oil resistance, heat resistance, and low-friction properties. The present inventors have then focused on the methods for producing a rubber composition. As a result, the inventors have found that when a rubber composition is produced by co-coagulating an acrylonitrile-butadiene rubber and a specific fluororesin, a molded article with excellent properties of non-stickiness, oil resistance, heat resistance, and low-friction properties can be produced from the rubber composition. Thereby, the present invention has been completed.

That is, the present invention relates to an acrylonitrile-butadiene rubber composition including: an acrylonitrile-butadiene rubber (A); and a fluororesin (B), the fluororesin (B) being a perhalopolymer, the composition formed from a co-coagulated composition obtained by co-coagulating the acrylonitrile-butadiene rubber (A) and the fluororesin (B).

Preferably, in the acrylonitrile-butadiene rubber composition of the present invention, the fluororesin (B) is dispersed as particles in the acrylonitrile-butadiene rubber (A), and the fluororesin (B) has an average dispersed particle diameter of 3 to 700 nm.

Preferably, the fluororesin (B) is at least one selected from the group consisting of tetrafluoroethylene/hexafluoropropylene copolymer, tetrafluoroethylene/hexafluoropropylene/perfluoro(alkyl vinyl ether) copolymer, tetrafluoroethylene/perfluoro(alkyl vinyl ether) copolymer, polychlorotrifluoroethylene, and chlorotrifluoroethylene/tetrafluoroethylene copolymer.

Preferably, the acrylonitrile-butadiene rubber (A) contains 10% by mass or more of combined acrylonitrile.

The present invention also relates to an acrylonitrile-butadiene rubber molded article obtained by crosslinking the acrylonitrile-butadiene rubber composition.

The present invention also relates to a method for producing an acrylonitrile-butadiene rubber molded article, including the steps of: (I) co-coagulating an acrylonitrile-butadiene rubber (A) and a fluororesin (B) being a perhalopolymer to obtain a co-coagulated composition, followed by obtaining the acrylonitrile-butadiene rubber composition; and (II) molding and crosslinking the acrylonitrile-butadiene rubber composition.

The present invention also relates to an acrylonitrile-butadiene rubber molded article obtained by the production method.

Advantageous Effects of Invention

The acrylonitrile-butadiene rubber composition of the present invention having the above structure can give a molded article with excellent properties of non-stickiness, oil resistance, heat resistance, and low-friction properties.

The acrylonitrile-butadiene rubber molded article of the present invention has excellent properties of non-stickiness, oil resistance, heat resistance, and low-friction properties, and is therefore useful as a product such as a sealing material, a gasket, an O-ring material, and a packing material.

DESCRIPTION OF EMBODIMENTS

Figure 1:
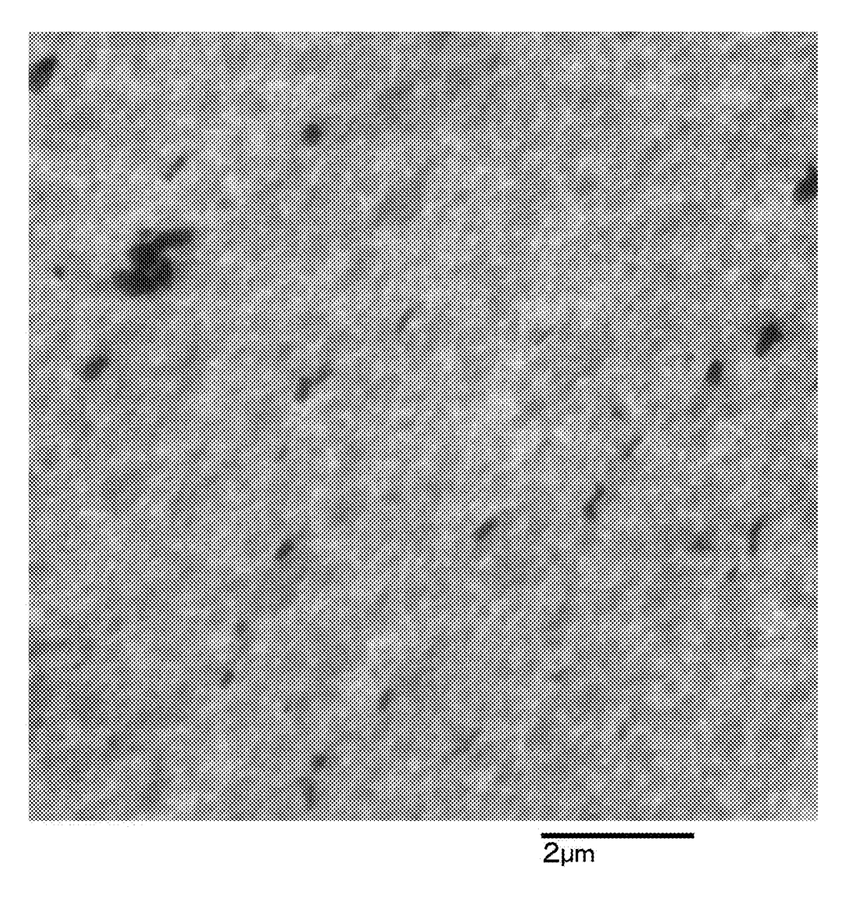
FIG. 1 is a transmission electron microscope photograph of an NBR composition obtained in an example.

The acrylonitrile-butadiene rubber (hereinafter, also referred to as "NBR") composition of the present invention contains a co-coagulated composition obtained by co-coagulating an NBR (A) and a fluororesin (B) being a perhalopolymer.

When the NBR composition contains the co-coagulated composition, the fluororesin (B) is uniformly dispersed in the NBR composition, and a molded article obtained from the NBR composition has excellent properties of non-stickiness, oil resistance, heat resistance, and low-friction properties, and does not deteriorate the flexibility inherent to the NBR.

With the conventional technique of mechanically kneading an NBR and a fluororesin (e.g. PTFE) with a roll, an extruder, or the like machine, it is difficult to perform nano-dispersion, and the ordinary physical state such as the mechanical strength may decrease. For this reason, only a very small amount of a fluororesin can be added, which leads to a failure in achievement of the desired non-stickiness, oil resistance, heat resistance, and low-friction properties.

In the NBR composition of the present invention which is produced from a co-coagulated composition obtained by co-coagulation, the fluororesin can be uniformly dispersed in the NBR composition even when a large amount of the fluororesin is added. As a result, the molded article obtained from the NBR composition can have significantly better non-stickiness, oil resistance, heat resistance, and low-friction properties than those of the conventional NBRs. Also, the properties can be maintained even when carbon, often used in mixing, is added.

Examples of the co-coagulation method include (i) a method of mixing an aqueous dispersion of an NBR (A) and an aqueous dispersion of a fluororesin (B), and coagulating the mixture; (ii) a method of adding an NBR (A) powder into an aqueous dispersion of a fluororesin (B), and then coagulating the mixture; and (iii) a method of adding a fluororesin (B) powder into an aqueous dispersion of an NBR (A), and then coagulating the mixture.

Preferred among these co-coagulation methods is the method (i) particularly from the viewpoint of the ease in uniformly dispersing the resins. Using such a method, a co-coagulated composition can be obtained in a powder form.

The co-coagulated composition is preferably obtained by mixing an aqueous dispersion of an NBR (A) and an aqueous dispersion of a fluororesin (B), coagulating the mixture, collecting the resulting coagulated product, and optionally drying the coagulated product.

The NBR composition of the present invention is preferably obtained by kneading at least the co-coagulated composition.

For example, the NBR composition of the present invention can be obtained by kneading the co-coagulated composition, and if necessary, agents such as a crosslinking agent (C), a crosslinking accelerator, an acid acceptor, and a sub-material using, for example, an open roll mill or an internal mixer which are commonly used in the rubber industry. Such a method enables production of an NBR composition in the form of pellets, for example.

Hereinafter, each component of the NBR composition of the present invention is described in detail.

(A) NBR

The NBR (A) is a rubber having favorable properties of oil resistance, abrasion resistance, and aging resistance, and has better cold resistance and is more inexpensive than fluororubbers. Examples of the NBR (A) include acrylonitrile-butadiene rubber (NBR), hydrogenated acrylonitrile-butadiene rubber (H-NBR), a blend rubber of acrylonitrile-butadiene rubber and polyvinyl chloride (NBR-PVC). These may be used alone or in combination.

The NBR (A) is usually produced by copolymerization of acrylonitrile (hereinafter, referred to as "AN") and butadiene. A large amount of the combined AN increases the oil resistance, while a small amount of the combined AN increases the cold resistance. In the case of a blend rubber with a polar resin, such as the above NBR-PVC, an increase in the amount of the combined AN relative to the NBR (excluding rubbers to be blended such as PVC) in the blend rubber leads to better compatibility. The amount of the combined AN is not particularly limited, and is usually 10% by mass or more. The amount of the combined AN is preferably 15 to 55% by mass from the viewpoints of excellent processability and excellent mechanical properties. The amount of the combined AN is measured in accordance with JIS K6384.

The NBR (A) preferably has a Mooney viscosity at 100° C. of 20 to 130, and more preferably 30 to 100. The Mooney viscosity is a value measured in accordance with ASTM D1646.

The NBR composition of the present invention may further contain a crosslinking agent (C). The crosslinking agent (C) may be appropriately selected depending on the NBR used, and generally a crosslinking agent typically used in crosslinking of an NBR composition can be used.

(C) Crosslinking Agent

The crosslinking system for crosslinking the NBR composition of the present invention can be any of a sulfur crosslinking system, a peroxide crosslinking system, an imidazole crosslinking system, a triazine crosslinking system, an oxazol crosslinking system, and a thiazole crosslinking system. In the case that the uncrosslinked rubber contains a crosslinkable group (cure site), the crosslinking system may be appropriately selected depending on the contained cure site, or the properties to be provided to the crosslinked molded article and the use thereof.

The crosslinking agent (C) may be any of a sulfur-based crosslinking agent, a peroxide crosslinking agent, an imidazole crosslinking agent, a triazine crosslinking agent, an oxazol crosslinking agent, and a thiazole crosslinking agent in accordance with the crosslinking system. These crosslinking agents may be used alone or in combination. The amount of the crosslinking agent (C) added is preferably 0.1 to 10.0 parts by mass, and more preferably 0.2 to 3.0 parts by mass, for each 100 parts by mass of the NBR (A).

In the case of the NBR, a sulfur crosslinking system or a peroxide crosslinking system is usually employed. The crosslinking agent (C) is preferably a sulfur-based crosslinking agent or a peroxide crosslinking agent, and more preferably a sulfur-based crosslinking agent.

The sulfur-based crosslinking agent is preferably at least one selected from the group consisting of powder sulfur, precipitated sulfur, colloidal sulfur, surface-treated sulfur, insoluble sulfur, sulfur chloride, sulfur dichloride, disulfide compounds, and polysulfide compounds.

The amount of the sulfur-based crosslinking agent used is preferably 0.1 to 10.0 parts by mass, and particularly preferably 0.2 to 3.0 parts by mass, for each 100 parts by mass of the NBR (A).

Preferred examples of the peroxide crosslinking agent include organic peroxides that easily generate peroxy radicals in the presence of heat or the redox system.

Examples of the organic peroxides include 1,1-bis(t-butylperoxy)-3,5,5-trimethylcyclohexane, 2,5-dimethylhexane-2,5-dihydroxy peroxide, di-t-butyl peroxide, t-butyl cumyl peroxide, dicumyl peroxide, α,α'-bis(t-butylperoxy)-p-diisopropylbenzene, 2,5-dimethyl-2,5-di(t-butylperoxy)hexane, 2,5-dimethyl-2,5-di(t-butylperoxy)hexyne-3, benzoyl peroxide, t-butylperoxy benzene, 2,5-dimethyl-2,5-di(benzoylperoxy)hexane, t-butylperoxymaleic acid, and t-butylperoxyisopropyl carbonate. Preferred among these are dialkyl compounds. Generally, the kind and the amount to be added are selected based on, for example, the amount of active —O═O— and the decomposition temperature. The amount to be added is usually 0.1 to 15.0 parts by mass, and preferably 0.3 to 5.0 parts by mass, for each 100 parts by mass of the NBR (A).

The crosslinkable rubber composition may contain additives such as a crosslinking accelerator, a crosslinking aid, a co-crosslinking agent, and an acid acceptor, so as to aid the crosslinking.

The crosslinking agent, the crosslinking accelerator, the crosslinking aid, and the co-crosslinking agent are used to crosslink the NBR. Here, crosslinking means crosslinking the same or different polymer chains of the NBR using a crosslinking agent. Such crosslinking increases the tensile strength of the NBR, giving favorable elasticity to the NBR.

In the case of using a peroxide crosslinking agent, a crosslinking aid can also be used such as p-quinone dioxime, p,p'-dibenzoyl quinonedioxime, lauryl methacrylate, ethylene glycol acrylate, triethylene glycol dimethacrylate, tetraethylene glycol dimethacrylate, polyethylene glycol dimethacrylate, trimethylolpropene trimethacrylate, methylol methacrylate, diaryl fumarate, diaryl phthalate, tetraaryloxyethane, triaryl cyanurate, triallyl isocyanurate, maleimide, phenyl maleimide, N,N'-m-phenylene bismaleimide, maleic anhydride, itaconic acid, divinylbenzene, vinyl toluene, and 1,2-polybutadiene.

(B) Fluororesin

The fluororesin (B) is preferably a perhalopolymer. The fluororesin (B) herein refers to a fully halogenated fluororesin. The fully halogenated fluororesin refers to one that contains at least one fluorine atom, and the elements bonded to the carbon atoms constituting the main chain of the polymer include no hydrogen atom, and are each a halogen (e.g., fluorine, chlorine), a fluoroalkyl group, or a fluoroalkoxy group.

In the case that the fluororesin (B) is a perhalopolymer, the resulting NBR molded article has excellent properties of non-stickiness, oil resistance, heat resistance, and low-friction properties.

The fluororesin (B) is a polymer having a polymerization unit based on at least one fluoroethylenic monomer, and the fluoroethylenic monomer is a perhalomonomer.

The fluororesin (B) is preferably a melt-processable fluororesin. A melt-processable fluororesin gives even better properties of non-stickiness, oil resistance, heat resistance, and low-friction properties to the NBR molded article of the present invention.

The melt processable fluororesin is preferably at least one selected from the group consisting of tetrafluoroethylene (TFE)/hexafluoropropylene (HFP) copolymer, TFE/HFP/perfluoro(alkyl vinyl ether) (PAVE) copolymer, TFE/PAVE copolymer [PFA], polychlorotrifluoroethylene [PCTFE], and chlorotrifluoroethylene (CTFE)/TFE copolymer. Also, when the fluororesin is melt-processable, a low molecular weight polytetrafluoroethylene (PTFE) can also be used.

The melting point of the fluororesin (B) is preferably equal to or higher than the crosslinking temperature of the NBR (A). The melting point of the fluororesin (B) is appropriately determined depending on the NBR (A) used, but is preferably 160° C. or higher, more preferably 180° C. or higher, and still more preferably 200° C. or higher. The upper limit therefor is not particularly limited, but may be, for example, 300° C.

If the melting point is excessively low, the heat resistance may not sufficiently increase.

The melting point of the fluororesin (B) is the melting point peak of a heat absorption curve obtained using a differential scanning calorimeter, in accordance with ASTM D-4591, by heating at a rate of temperature rise of 10° C./min, decreasing the temperature at a rate of temperature drop of −10° C./min once the temperature reaches 30° C. above a melting point peak, and increasing the temperature at a rate of temperature rise of 10° C./min again up to 30° C. above the melting point peak.

The above fluororesin (B) preferably has a melt flow rate (MFR) measured at 372° C. of 0.3 to 200 g/10 min, and more preferably 1 to 100 g/10 min. If the MFR is excessively low, the low-friction properties may be inferior, while if the MFR is excessively high, molding may be difficult.

The MFR is a value determined by measurement at a temperature of 372° C. and a load of 5 kg in accordance with ASTM D3307-01.

From the viewpoint of production of an NBR molded article having excellent properties of non-stickiness, oil resistance, heat resistance, and low-friction properties, the fluororesin (B) is preferably a copolymer having a TFE unit (a) and an HFP unit (b) (hereinafter, also referred to as "FEP").

FEP is a copolymer consisting of a TFE unit (a) and an HFP unit (b), or a copolymer of a TFE unit (a), an HFP unit (b), and a polymerization unit based on a monomer copolymerizable with TFE and HFP.

In the case that FEP is a copolymer of a TFE unit (a), an HFP unit (b), and a polymerization unit based on a monomer copolymerizable with TFE and HFP, examples of the monomer copolymerizable with TFE and HFP include a perfluoro (alkyl vinyl ether) [PAVE] represented by the following formula:

wherein $Rf^6$ represents a $C_1$-$C_5$ perfluoroalkyl group, and a vinyl monomer represented by wherein $X^8$ represents a fluorine atom or a chlorine atom, and n represents an integer of 2 to 10. Since the monomer copolymerizable with TFE and HFP is a perhalomonomer, the resulting NBR molded article has even better properties of non-stickiness, oil resistance, heat resistance, and low-friction properties. More preferred among the perhalomonomers is PAVE.

The fluororesin (B) is preferably, for example, at least one selected from the group consisting of TFE/HFP copolymer and TFE/HFP/PAVE copolymer.

The PAVE is preferably at least one selected from the group consisting of perfluoro(methyl vinyl ether) [PMVE], perfluoro(ethyl vinyl ether) [PEVE], perfluoro(propyl vinyl ether) [PPVE], and perfluoro(butyl vinyl ether). The PAVE is more preferably at least one selected from the group consisting of PMVE, PEVE, and PPVE.

The fluororesin (B) is a polymer including a tetrafluoroethylene (TFE) unit (a) and a hexafluoropropylene (HFP) unit (b), and is preferably a copolymer with a mole ratio of TFE unit (a)/HFP unit (b) of 80.0-90.0/10.0-20.0.

From the viewpoint of reducing the compression set of the resulting NBR molded article, the fluororesin (B) is preferably at least one selected from the group consisting of the following fluororesins (B1) and (B2) which have specific compositions.

The fluororesins (B1) and (B2) are copolymers including a tetrafluoroethylene unit and a hexafluoropropylene unit each having a specific composition. When the NBR composition of the present invention contains the fluororesin (B1) or (B2) having a specific composition, the low compression set of the molded article obtained from the NBR composition can be improved without deterioration in the non-stickiness, oil resistance, heat resistance, and low-friction properties.

The fluororesin (B1) is a polymer consisting only of a tetrafluoroethylene (TFE) unit (a) and a hexafluoropropylene (HFP) unit (b), and is a copolymer having a mole ratio of TFE unit (a)/HFP unit (b) of 80.0-87.3/12.7-20.0. If the fluororesin (B1) has a composition in the above specific range, the fluororesin (B1) can give non-stickiness, oil resistance, heat resistance, and low-friction properties to the resulting NBR molded article without deterioration in the compression set of the NBR molded article.

From the viewpoints of preventing deterioration in the compression set of the NBR molded article and providing excellent mechanical properties, the fluororesin (B1) has a mole ratio of (a)/(b) of 82.0-87.0/13.0-18.0, more preferably 83.0-86.5/13.5-17.0, and still more preferably 83.0-86.0/14.0-17.0. If the ratio of (a)/(b) is excessively large, the compression set of the resulting NBR molded article may be deteriorated. If the ratio of (a)/(b) is excessively small, the mechanical properties are more likely to decrease.

The fluororesin (B2) is a copolymer of a TFE unit (a), an HFP unit (b), and a polymerization unit (c) based on a monomer copolymerizable with TFE and HFP, in which a mole ratio (a)/(b) is 80.0-90.0/10.0-20.0, and a mole ratio (c)/{(a)+(b)} is 0.1-10.0/90.0-99.9 (here, {(a)+(b)} refers to the sum of the TFE unit (a) and the HFP unit (b)). When the mole ratio of (a)/(b) is 80.0-90.0/10.0-20.0 and a mole ratio of (c)/{(a)+(b)} is 0.1-10.0/90.0-99.9, the fluororesin (B2) can give non-stickiness, oil resistance, heat-resistance, and low-friction properties to the resulting NBR molded article without deterioration in the compression set of the article.

From the viewpoint of further reduction of the compression set and achievement of excellent mechanical properties, the mole ratio of (a)/(b) is preferably 82.0-88.0/12.0-18.0.

The fluororesin (B2) preferably has a mole ratio of (c)/{(a)+(b)} of 0.3-8.0/92.0-99.7.

The monomer copolymerizable with TFE and HFP is the same as described above.

In the fluororesin (B2), the polymerization unit (c) based on a monomer copolymerizable with TFE and HFP is preferably a PAVE unit. The fluororesin (B2) is more preferably a copolymer consisting only of a TFE unit, an HFP unit, and a PAVE unit.

The fluororesins (B1) and (B2) each preferably have a melting point of 160° C. or higher, more preferably 180° C. or higher, and still more preferably 200° C. or higher. The upper limit is not particularly limited, but can be 300° C., for example.

(NBR Composition)

The NBR composition of the present invention preferably has a ratio by volume of NBR (A)/fluororesin (B) of 60/40 to 98/2. If the proportion of the fluororesin (B) is excessively low, the non-stickiness, oil resistance, heat resistance, and low-friction properties of the resulting NBR molded article may be insufficient, while if the proportion of the NBR (A) is excessively low, the flexibility may be deteriorated. From the viewpoint of achieving both favorable flexibility and favorable properties of non-stickiness, oil resistance, heat resistance, and low-friction properties of the molded article obtained from the NBR composition, the ratio by volume of (A)/(B) is more preferably 65/35 to 95/5, and still more preferably 70/30 to 90/10.

Preferably in the NBR composition of the present invention, particles of the fluororesin (B) are dispersed in the acrylonitrile-butadiene rubber (A), and the fluororesin (B) has an average dispersed particle diameter of 3 to 700 nm.

If the average dispersed particle diameter is in the above range, the non-stickiness, oil resistance, heat resistance, and low-friction properties of the resulting NBR molded article can be even better. If the average dispersed particle diameter of the fluororesin (B) is excessively large, the non-stickiness and low-friction properties may be insufficient. If the average dispersed particle diameter is excessively small, the dispersed particles are more likely to be reaggregated in kneading, which may deteriorate the mechanical properties.

The average dispersed particle diameter of the fluororesin (B) is more preferably 5 to 600 nm, still more preferably 10 to 500 nm, particularly preferably 15 to 400 nm, even more preferably 20 to 300 nm, and further more preferably 20 to 200 nm.

The average dispersed particle diameter of the fluororesin (B) can be determined by observing with a confocal laser scanning microscope the NBR composition of the present invention obtained by kneading at least the co-coagulated composition, or observing with a transmission electron microscope (TEM) an ultra-thin piece cut out from a press sheet produced from the NBR composition; and then binarizing the obtained image with an optical analysis device.

The NBR composition of the present invention contains the NBR (A), the fluororesin (B), and if necessary, agents such as a crosslinking agent, a crosslinking accelerator, and an acid acceptor, and the composition may further contain at least one multifunctional compound for improvement in the compatibility. The multifunctional compound is a compound having at least two same or different functional groups in one molecule. The multifunctional compound is a compound having at least two same or different functional groups in one molecule.

The functional groups of the multifunctional compound may be any functional group generally known to be reactive, such as a carbonyl group, a carboxyl group, a haloformyl group, an amido group, an olefin group, an amino group, an isocyanato group, a hydroxy group, and an epoxy group. Compounds having these functional groups are expected to have high affinity with the NBR (A), and react with the reactive functional groups of the fluororesin (B), thereby improving the compatibility.

The NBR composition of the present invention may further contain a sub-material added to the usual rubber compound.

Examples of the sub-material include various additives such as antioxidants (e.g., diphenylamine derivatives, phenylenediamine derivatives), processing aids (e.g., stearic acid), fillers (e.g., carbon black, kaolin clay, talc, diatomite), plasticizers, colorants, stabilizers, adhesive aids, mold-release agents, electrical conductivity imparting agents, thermal conductivity imparting agents, anti-tackifiers for surfaces, flexibility imparting agents, thermal resistance improvers, and flame retardants. These sub-materials are used if they do not impair the effect of the present invention.

The NBR composition of the present invention preferably contains carbon black. If the composition contains carbon black, a molded article having excellent mechanical strength and excellent abrasion resistance can be obtained.

The NBR composition of the present invention can maintain the non-stickiness, oil resistance, heat resistance, and low-friction properties even when the composition contains carbon black.

The amount of carbon black for each 100 parts by mass of a combination of the NBR (A) and the fluororesin (B) is preferably 1 to 100 parts by mass, more preferably 5 to 80 parts by mass, and still more preferably 10 to 60 parts by mass.

When the amount of carbon black is within the above range, the mechanical strength and abrasion resistance can be even better.

The NBR molded article of the present invention can be obtained by crosslinking the NBR composition containing the NBR (A) and the fluororesin (B). The NBR molded article of the present invention is not limited if the molded article is obtained by crosslinking the NBR composition, but the NBR molded article is preferably obtained by the later-described production method.

Since the NBR molded article of the present invention is obtained from the NBR composition, the NBR molded article has excellent properties of non-stickiness, oil resistance, heat resistance, and low-friction properties, and further has excellent flexibility.

The NBR molded article of the present invention is useful as a product such as a sealing material, a packing material, and an O-ring material, due to its excellent properties of non-stickiness, oil resistance, heat resistance, and low-friction properties.

Specific examples thereof include, but not limited to, the following molded articles.

Sealing Materials

In the fields relating to semiconductors such as semiconductor producing devices, liquid crystal panel producing devices, plasma panel producing devices, plasma-addressed liquid crystal panels, field emission display panels, and solar battery substrates, examples of the sealing material include O (square)-rings, packings, gaskets, diaphragms, and other various sealing materials. These sealing materials can be used for CVD devices, dry etching devices, wet etching devices, oxidation diffusion devices, sputtering devices, ashing devices, washing devices, ion implanting devices, and gas discharging devices. Specific examples of the sealing material include O-rings for gate valves, O-rings for quartz windows, O-rings for chambers, O-rings for gates, O-rings for bell jars, O-rings for couplings, O-rings and diaphragms for pumps, O-rings for semiconductor gas control devices, O-rings for resist developers and peeling liquids, and other various sealing materials.

In the field of automobiles, the acrylic rubber molded articles can be used as sealing materials such as gaskets, shaft seals, valve stem seals, or other various sealing materials for engines and the peripheral devices thereof, or various sealing materials for automatic transmissions. Examples of the sealing material for fuel systems and the peripheral devices thereof include O (square)-rings, packings, and diaphragms. Specific examples thereof include engine head gaskets, metal gaskets, oil pan gaskets, crankshaft seals, camshaft seals, valve stem seals, manifold packings, seals for oxygen sensors, injector O-rings, injector packings, fuel pump O-rings, diaphragms, crankshaft seals, gear box seals, power piston packings, cylinder liner seals, valve stem seals, automatic transmission front pump seals, rear axle pinion seals, universal joint gaskets, speed meter pinion seals, foot brake piston cups, torque transmission O-rings, oil seals, exhaust gas recirculation system seals, bearing seals, and carburetor sensor diaphragms.

In the airplane, rocket and shipbuilding fields, examples of the sealing material include diaphragms, O (square)-rings, valves, packings, and other various sealing materials, and these can be used in fuel systems. Specifically, in the airplane field, the molded article are used as, for example, jet engine valve stem seals, gaskets and O-rings, rotating shaft seals, and hydraulic gaskets and fire wall seals; in the shipbuilding field, the molded articles are used as screw propeller shaft stern seals, diesel engine suction and exhaust valve stem seals, butterfly valve seals, and butterfly valve shaft seals.

Examples of the sealing materials in the chemical plant field include valves, packings, diaphragms, O (square)-rings, and other various sealing materials, and these can be used in various steps of producing chemicals such as medicinal chemicals, agrochemicals, paints and resins. More specifically, the molded articles can be used as seals in chemical pumps, flowmeters and piping systems, heat exchanger seals, glass cooler packings in sulfuric acid production plants, seals in agrochemical spreaders and agrochemical transfer pumps, gas piping seals, plating bath seals, high-temperature vacuum drier packings, papermaking belt roller seals, fuel cell seals, wind tunnel joint seals, tube joining part packings in gas chromatographs and pH meters, and seals, diaphragms and valve parts in analytical apparatus and physical and chemical apparatus.

In the photographic field (e.g., developing machines), the printing field (e.g., printing machines), and the painting field (e.g., painting equipment), the molded articles can be used, for example, as seals and valve parts in dry-process copying machines.

Also, the molded articles can be used for rolls and belts for the above fields.

In the food industry plant equipment field, examples of the sealing material include valves, packings, diaphragms, O (square)-rings and various sealing materials, and these can be used in food production steps. More specifically, the molded articles can be used as plate type heat exchanger seals, and vending machine electromagnetic valve seals.

In the nuclear power plant equipment field, examples of the sealing material include packings, O-rings, diaphragms, valves, and various seal members.

In the general industry field, examples of the sealing material include packings, O-rings, diaphragms, valves, and various seal members. More specifically, the molded articles are used as, for example, seals and bearing seals in hydraulic and lubricating systems, windows and other seals in dry cleaning equipment, uranium hexafluoride enrichment apparatus seals, seal (vacuum) valves in cyclotrons, automatic packaging machine seals, and diaphragms in pumps (in pollution-monitoring apparatus) for analyzing sulfurous acid gas and chlorine gas in air.

In the electric system field, the molded articles are specifically used as, for example, bullet train (Shinkansen) insulating oil caps, and liquid-sealed transformer benching seals.

In the fuel cell field, the molded articles are specifically used as, for example, seal materials between electrodes of the fuel cell or between electrodes and a separator and as seals (packings) in hydrogen, oxygen or product water piping systems.

In the electronic component field, the molded articles are specifically used as, for example, radiator materials, electromagnetic wave shield materials, and computer hard disk drive gaskets.

Those sealing materials which can be used in situ molding are not particularly limited, and examples thereof include engine oil pan gaskets, gaskets for magnetic recording apparatus, and clean room filter unit sealing materials.

The molded articles can be particularly suitably used as gaskets for magnetic recording apparatus (hard disk drives) and sealing materials for clean equipment such as sealing materials in semiconductor manufacturing apparatus or storehouses for wafers or other devices.

Sliding Members

In the automobile-related fields, examples of the sliding members include piston rings, shaft seals, valve stem seals, crankshaft seals, camshaft seals, oil seals, and transmission seals.

Generally, the examples include NBR products used as parts that slide in contact with other materials.

Non-Sticking Members

Examples of the non-sticking member in the computer field include hard disk crash stoppers.

Examples thereof in office automation equipment field include fixing rolls and belts.

Fields Utilizing Water Repellency and Oil Repellency

Examples of the application include automobile wiper blades and coated fabrics for outdoor tents.

Medical Field

Examples of the application include gaskets for syringes.

In the following, the method for producing the NBR molded article of the present invention will be described. The NBR molded article produced by the method of producing the NBR molded article of the present invention has better properties of non-stickiness, oil resistance, heat resistance, and low-friction properties.

The NBR molded article can be produced by a production method including the steps of: (I) co-coagulating the NBR (A) and the fluororesin (B) to obtain a co-coagulated composition, followed by obtaining the NBR composition; and (II) molding and crosslinking the NBR composition.

Each of the steps is described below.

Step (I)

This step includes co-coagulating the NBR (A) and the fluororesin (B) to obtain a co-coagulated composition, followed by obtaining the NBR composition.

Examples of the co-coagulation include (i) a method of mixing an aqueous dispersion of the NBR (A) and an aqueous dispersion of the fluororesin (B), and coagulating the mixture; (ii) a method of adding a powder of the NBR (A) into the fluororesin (B), and coagulating the mixture; and (iii) a method of adding a powder of the fluororesin (B) into an aqueous dispersion of the NBR (A), and coagulating the mixture.

Preferred among the above co-coagulation methods is the method (i) particularly from the viewpoint of ease in uniformly dispersing the resins.

Coagulation by the coagulation methods (i) to (iii) can be performed using a coagulant, for example. Examples of such a coagulant include, but not particularly limited to, known coagulants such as aluminum salts (e.g., aluminum sulfate, alum), calcium salts (e.g., calcium sulfate), magnesium salts (e.g., magnesium sulfate, magnesium chloride), and monovalent cationic salts (e.g. sodium chloride, potassium chloride). In coagulation with a coagulant, acid or alkali may be added to control the pH to promote the coagulation.

Since some crosslinking systems of an NBR require a crosslinking agent, the step (I) is preferably a step of co-coagulating the NBR (A) and the fluororesin (B) to obtain a co-coagulated composition, followed by obtaining an NBR composition by kneading the co-coagulated composition and a crosslinking agent (C).

Kneading of the co-coagulated composition and the crosslinking agent (C) can be performed by any of conventionally known methods. For example, the co-coagulated composition and the crosslinking agent (C) may be kneaded using an open roll mill with time and a temperature which are enough for sufficient kneading.

From the viewpoint of providing the fluororesin (B) with an average dispersed particle diameter of 3 to 700 nm, the kneading is preferably performed at a temperature that is lower than the melting point of the fluororesin by 50° C. or more.

Also, the co-coagulated composition may also be mixed with agents such as the acid acceptor, the crosslinking accelerator, and the sub-material, as well as the crosslinking agent (C).

(II) Step of Molding and Crosslinking

This step is for molding and crosslinking the NBR composition obtained in step (I) to produce a crosslinked molded article. The order of molding and crosslinking is not limited. Molding may precede crosslinking, crosslinking may precede molding, or molding and crosslinking may be simultaneously performed.

For products such as hoses and elongated plates, it is suitable that extrusion-molding precedes crosslinking. For irregular-shaped molded articles, production of a block-shaped crosslinked product can precede a molding treatment such as cutting. For relatively simple molded articles such as piston rings and oil seals, it is also common that molding and crosslinking are simultaneously performed.

Examples of the molding methods include, but not limited to, an extrusion molding method, a pressure molding method using a metal mold, and an injection molding method.

The crosslinking may be performed by a usual method such as steam crosslinking, pressure-molding, radiation crosslinking, and a method in which the crosslinking reaction is started by heating. From the viewpoint of processability, crosslinking by heating is suitable.

The crosslinking temperature is preferably not lower than the crosslinking temperature of the NBR (A) but not higher than the melting point of the fluororesin (B).

The crosslinking time is, for example, 1 minute to 24 hours, which may be appropriately set depending on the crosslinking agent used.

The methods and conditions of molding and crosslinking the NBR composition may be within the ranges of the known methods and conditions for the molding and crosslinking used.

The nonlimiting specific crosslinking conditions may usually be appropriately determined depending on the crosslinking agent used, for example, within the temperature range of 150° C. to 180° C. and the crosslinking time of 1 minute to 24 hours.

The production method of the present invention enables production of an NBR molded article with significantly improved fluororesin properties such as non-stickiness, heat resistance, and low-friction properties.

Moreover, in regions other than the surface, properties of the NBR can be exhibited. As a result, an NBR molded article can be obtained which as a whole has excellent properties of low compression set, non-stickiness, oil resistance, heat resistance, and low-friction properties in a balanced manner. Also, the obtained NBR molded article having no clear interface between the fluororesin and the NBR is not likely to cause falling or peeling of the fluororesin-rich surface region, and thus has better durability than the articles obtained by modifying the NBR surface through application or bonding of a fluororesin to the NBR surface.

EXAMPLES

In the following, the present invention is described based on examples which, however, are not intended to limit the scope of the present invention.

The properties in the present description were determined by the following methods.

(1) Monomer Composition of Fluororesin

The monomer composition was determined by a $^{19}$F-NMR measurement with a nuclear magnetic resonance apparatus AC300 (Bruker-Biospin) at a measuring temperature of (melting point of the polymer+50)° C.

(2) Melting Point of Fluororesin

The melting point of the fluororesin was the melting point peak of a heat absorption curve obtained using a differential scanning calorimeter RDC220 (Seiko Instruments Inc.), in accordance with ASTM D-4591, by heating at a rate of temperature rise of 10° C./min, decreasing the temperature at a rate of temperature drop of −10° C./min once the temperature reaches 30° C. above a melting point peak, and increasing the temperature at a rate of temperature rise of 10° C./min again up to 30° C. above the melting point peak.

(3) Melt Flow Rate (MFR) of Fluororesin

The MFR is the mass (g/10 min) of the polymer determined by letting the polymer flow out from a nozzle (inner diameter: 2 mm, length: 8 mm) of a melt indexer (Toyo Seiki Seisaku-sho, Ltd.) for each 10 minutes at 280° C. and a load of 5 kg in accordance with ASTM D3307-01.

(4) Storage Elastic Modulus (E') of Fluororesin

The storage elastic modulus is a value determined by dynamic viscoelasticity measurement at 70° C., using a sample (length: 30 mm, width: 5 mm, thickness: 0.25 mm) with a dynamic viscoelasticity analyzer DVA220 (IT KEISOKU SEIGYO K.K.) in a tensile mode at a grip width of 20 mm, a measurement temperature of from 25° C. to 200° C., a rate of temperature rise of 2° C./min, and a frequency of 1 Hz.

(5) Measurement of Thermal Decomposition Onset Temperature (1% Mass Loss Temperature)

The thermal decomposition onset temperature is a temperature at which the mass of the fluororesin was reduced by 1% in a heating test using a thermogravimetric/differential thermal analysis (TG-DTA) device.

(6) Dynamic Friction Coefficient

The dynamic friction coefficient is the friction coefficient determined with a friction player FPR-2000 (Rhesca Corp.) at a load of 20 g (pin: φ5 mm SUJ2) in a rotation mode at a rotation rate of 120 rpm and a rotation radius of 10 mm, in a stable state after rotation of at least 5 minutes.

(11) Non-Stickiness (Tackiness)

The tackiness was determined in a process of pressing a measurement probe (φ5.0 mm cylinder-shaped SUS304), controlled under the following conditions, onto a molded sheet with a surface temperature of 40° C., and pulling the probe away from the sheet.

Approaching speed: 120 mm/min
Pressure: 500 gf
Pressurizing time: 30 s
Pulling speed: 600 mm/min (8) Oil Resistance In accordance with JIS B2401 9.2.5, the tensile strength change, the elongation change, the hardness change, and the volume change were measured.

Oil used: IRM903
Oil temperature: 120° C.
Immersion time: 70 hours (9) Heat Resistance In accordance with JIS B2401 9.2.3, the tensile strength change, the elongation change, the hardness change were measured.

Atmospheric temperature: 120° C.
Time: 70 hours (10) Tensile Strength

This value was determined in accordance with JIS K6251.

(11) Elongation

This value was determined in accordance with JIS K6251.

(12) Hardness

This value (peak value) was measured in accordance with JIS K6253 with a type A durometer.

(13) Average Dispersed Particle Diameter of Fluororesin

The crosslinkable compositions (NBR compositions) produced in the examples and comparative examples were each compression molded by a heat pressing machine at 160° C. and 4 MPa, so that a 2-mm-thick sheet was produced.

The produced press sheet was trimmed to have a 1-mm square end with a trimming razor. The trimmed sheet was held in a sample holder of an ultramicrotome (ULTRACUT S from Leica Microsystems). The inside of the chamber was cooled with liquid nitrogen to −80° C., and a 90-nm-thick ultra-thin piece was cut out from the sheet.

The obtained ultra-thin piece was collected using a platinum ring on which a 20% solution of ethanol was deposited, and the ultra-thin piece was adhered to a copper mesh sheet (200 A, φ3.0 mm, Okenshoji Co., Ltd).

Then, the ultra-thin piece adhered to the copper mesh sheet was observed with a transmission electron microscope (H7100FA, Hitachi, Ltd.).

A negative film obtained by microscopic observation was converted into an electronic image with a scanner (GT-94001F, SEIKO EPSON CORPORATION). The electronic image was binarized with an optical analyzer (LUZEX AP, Nireco Corporation), whereby an average dispersed particle diameter of the dispersion layer was determined.

(14) Amount of Combined AN of Acrylonitrile-Butadiene Rubber

This value was determined in accordance with JIS 6384.

The materials mentioned herein and in the table are the following materials.

Zinc oxide: Zinc oxide No. 2, Sakai Chemical Industry Co., Ltd.

Stearic acid: ADEKA SA-400, ADEKA Corporation

Sulfur (fine powder): #325, Tsurumi Chemical Industry Co., Ltd.

Antage RD (antioxidant): Kawaguchi Chemical Industry Co., Ltd.

SANWAX 171P: Sanyo Chemical Industries, Ltd.

SEAST S: Tokai Carbon Co., Ltd.

Nipsil VN3: Tosoh Silica Corporation

TP-95: Naka Enterprise Co., Ltd.

Actor R (vulcanizer): Kawaguchi Chemical Industry Co., Ltd.

SANCELER CM-G (vulcanization accelerator): SANSHIN CHEMICAL INDUSTRY CO., LTD.

SANCELER TT-G (vulcanization accelerator): SANSHIN CHEMICAL INDUSTRY CO., LTD.

Acrylonitrile-Butadiene Rubber Emulsion (A1)

(Trade name: Nipol 1562, amount of combined AN: 33.5% by mass, 41% by weight concentration emulsion, ZEON CORPORATION)

FEP Aqueous Dispersion (B1)

(TFE/HFP copolymer, TFE/HFP=87.9/12.1 (mole ratio), solids concentration 21% by weight, MFR 31.7 g/10 min, melting point 215° C.)

FEP Aqueous Dispersion (B2)

(TFE/HFP copolymer, TFE/HFP=87.9/12.1 (mole ratio), solids concentration 5% by weight, MFR 31.7 g/10 min, melting point 215° C.)

FEP Aqueous Dispersion (B3)

(TFE/HFP copolymer, TFE/HFP=89.1/10.1 (mole ratio), solids concentration 22% by weight, MFR 5.7 g/10 min, melting point 245° C.)

Example 1-1

A homomixer (with no scraping blades) of a vacuum emulsifying plant (PVQ-5UN, MIZUHO INDUSTRIAL CO., LTD.) was charged with a premixed solution (670 g) obtained by mixing an FEP aqueous dispersion (B1) and an acrylonitrile-butadiene rubber emulsion (A1) into a solution of magnesium chloride (10 g) in water (2000 cc) to give a solids content ratio by volume of 85/15 (acrylonitrile-butadiene rubber/FEP). The solution was mixed at 4000 rpm for 3 minutes to be co-coagulated.

After the co-coagulation, the solids content was taken out, and dried in a drying furnace at 60° C. for 120 hours. The solids content was subjected to kneading with predetermined agents shown in Table 1 using an open roll, specifically by kneading (A-kneading) with zinc oxide, stearic acid, sulfur, an antioxidant (Antage RD), wax (SANWAX 171P), carbon (SEAST S), silica (Nipsil VN3), and oil (TP-95), and then by kneading (B-kneading) with a vulcanizer (Actor R) and a vulcanization accelerator (SANCELER CM-G and SANCELER TT-G). Thereby, a crosslinkable composition (NBR composition) was produced. The average dispersed particle diameter of the fluororesin was calculated by the method mentioned above, which resulted in an average dispersed particle diameter of 110 nm.

Then, the composition was molded in a molding die, and crosslinked at 160° C. for 10 minutes under a pressure of 40 kg/cm². Thereby, a crosslinked molded article was obtained.

Example 1-2

A crosslinkable composition and a crosslinked molded article were obtained in the same manner as in Example 1-1, except that the amounts of the agents were changed as shown in Table 1.

Examples 2-1 and 2-2

A crosslinkable composition and a crosslinked molded article were obtained in the same manner as in Example 1-1, except that the premixed solution had a solids content ratio by volume of 75/25 (acrylonitrile-butadiene rubber/FEP), and the amounts of the agents were changed as shown in Table 1.

Examples 3-1 and 3-2

A crosslinkable composition and a crosslinked molded article were obtained in the same manner as in Example 2-1, except that the FEP aqueous dispersion (B2) was used in place of the FEP aqueous dispersion (B1), and the amounts of the agents were changed as shown in Table 1.

Examples 4-1 and 4-2

A crosslinkable composition and a crosslinked molded article were obtained in the same manner as in Example 2-1, except that the FEP aqueous dispersion (B3) was used in place of the FEP aqueous dispersion (B1), and the amounts of the agents were changed as shown in Table 1.

Comparative Examples 1-1, 1-2, and 1-3

A crosslinkable composition and a crosslinked molded article were obtained in the same manner as in Example 1-1, except that in Example 1-1, a solution (670 g) of an acrylonitrile-butadiene rubber emulsion (A1) alone was used in place of the premixed solution, and the amounts of the agents were changed as shown in Table 1 to produce a solids content (solids content (A1')).

Comparative Examples 2-1 and 2-2

The solids content (A1') obtained in Comparative Example 1-1 and the solids content (B1') obtained using a solution (670 g) of the FEP aqueous dispersion (B1) alone in place of the premixed solution in Example 1-1 were each dried in a drying furnace 60° C. for 120 hours. The dried solids contents were kneaded with an open roll to give a solids content ratio by volume of (A1')/(B1') of 85/15. The kneaded product was further kneaded with predetermined agents shown in Table 1 using an open roll, specifically by kneading (A-kneading) with zinc oxide, stearic acid, sulfur, an antioxidant (Antage RD), wax (SANWAX 171P), carbon (SEAST S), silica (Nipsil VN3), and oil (TP-95), and then by kneading (B-kneading) with a vulcanizer (Actor R) and a vulcanization accelerator (SANCELER CM-G and SANCELER TT-G). Thereby, a crosslinkable composition (NBR composition) was produced. Then, the crosslinkable composition was molded in a molding die, and crosslinked at 160° C. for 10 minutes under a pressure of 40 kg/cm². Thereby, a crosslinkable composition and a crosslinked molded article were obtained.

Comparative Examples 3-1 and 3-2

A crosslinkable composition and a crosslinked molded article were obtained in the same manner as in Example 1-1, except that the agents were kneaded with an open roll to give a solids content by volume of (A1')/(B1') of 75/25.

TABLE 1

|  | Comparative Example 1-1 | Comparative Example 1-2 | Comparative Example 1-3 | Comparative Example 2-1 | Comparative Example 2-2 | Comparative Example 3-1 | Comparative Example 3-2 | Example 1-1 |
|---|---|---|---|---|---|---|---|---|
| FEP used | — | — | — | B1 | B1 | B1 | B1 | B1 |
| NBR (parts by mass) | 100 | 100 | 100 | 100 | 100 | 100 | 100 | 100 |
| FEP (parts by mass) | — | — | — | 37.06 | 37.06 | 70 | 70 | 37.06 |
| NBR/FEP (% by volume) | — | — | — | 85/15 | 85/15 | 75/25 | 75/25 | 85/15 |
| A-kneading | | | | | | | | |
| Zinc oxide (parts by mass) | 5 | 5 | 5 | 5 | 5 | 5 | 5 | 5 |
| Stearic acid (parts by mass) | 1 | 1 | 1 | 1 | 1 | 1 | 1 | 1 |
| Sulfur (parts by mass) | 0.3 | 0.3 | 0.3 | 0.3 | 0.3 | 0.3 | 0.3 | 0.3 |
| Antage RD (parts by mass) | 2 | 2 | 2 | 2 | 2 | 2 | 2 | 2 |
| SANWAX 171P (parts by mass) | 2 | 2 | 2 | 2 | 2 | 2 | 2 | 2 |
| SEAST S (parts by mass) | 15 | 25 | 35 | 15 | 25 | 15 | 25 | 15 |
| Nipsil VN3 (parts by mass) | 15 | 15 | 15 | 15 | 15 | 15 | 15 | 15 |
| TP-95 (parts by mass) | 15 | 15 | 15 | 15 | 15 | 15 | 15 | 15 |
| B-kneading | | | | | | | | |
| Actor R (parts by mass) | 1 | 1 | 1 | 1 | 1 | 1 | 1 | 1 |
| SANCELER CM-G (parts by mass) | 1.5 | 1.5 | 1.5 | 1.5 | 1.5 | 1.5 | 1.5 | 1.5 |
| SANCELER TT-G (parts by mass) | 1.5 | 1.5 | 1.5 | 1.5 | 1.5 | 1.5 | 1.5 | 1.5 |
| Average dispersed particle diameter (nm) | — | — | — | 2500 | 3100 | 2800 | 3300 | 110 |

|  | Example 1-2 | Example 2-1 | Example 2-2 | Example 3-1 | Example 3-2 | Example 4-1 | Example 4-2 |
|---|---|---|---|---|---|---|---|
| FEP used | B1 | B1 | B1 | B2 | B2 | B3 | B3 |
| NBR (parts by mass) | 100 | 100 | 100 | 100 | 100 | 100 | 100 |
| FEP (parts by mass) | 37.06 | 70 | 70 | 70 | 70 | 70 | 70 |
| NBR/FEP (% by volume) | 85/15 | 75/25 | 75/25 | 75/25 | 75/25 | 75/25 | 75/25 |
| A-kneading | | | | | | | |
| Zinc oxide (parts by mass) | 5 | 5 | 5 | 5 | 5 | 5 | 5 |
| Stearic acid (parts by mass) | 1 | 1 | 1 | 1 | 1 | 1 | 1 |
| Sulfur (parts by mass) | 0.3 | 0.3 | 0.3 | 0.3 | 0.3 | 0.3 | 0.3 |
| Antage RD (parts by mass) | 2 | 2 | 2 | 2 | 2 | 2 | 2 |
| SANWAX 171P (parts by mass) | 2 | 2 | 2 | 2 | 2 | 2 | 2 |
| SEAST S (parts by mass) | 25 | 15 | 25 | 15 | 25 | 15 | 25 |
| Nipsil VN3 (parts by mass) | 15 | 15 | 15 | 15 | 15 | 15 | 15 |
| TP-95 (parts by mass) | 15 | 15 | 15 | 15 | 15 | 15 | 15 |
| B-kneading | | | | | | | |
| Actor R (parts by mass) | 1 | 1 | 1 | 1 | 1 | 1 | 1 |
| SANCELER CM-G (parts by mass) | 1.5 | 1.5 | 1.5 | 1.5 | 1.5 | 1.5 | 1.5 |
| SANCELER TT-G (parts by mass) | 1.5 | 1.5 | 1.5 | 1.5 | 1.5 | 1.5 | 1.5 |
| Average dispersed particle diameter (nm) | 98 | 102 | 106 | 38 | 35 | 215 | 210 |

The results of evaluation of non-stickiness, oil resistance, heat resistance, and abrasion properties are shown in Table 2.

TABLE 2

|  |  | Comparative Example 1-1 | Comparative Example 1-2 | Comparative Example 1-3 | Comparative Example 2-1 | Comparative Example 2-2 |
|---|---|---|---|---|---|---|
| Non-stickiness | Tackiness (g) | 220 | 215 | 220 | 198 | 245 |
| Oil resistance | Tensile strength change (%) | −41 | −38 | −42 | −47 | −46 |
|  | Elongation change (%) | −21 | −22 | −25 | −54 | −46 |
|  | Hardness change (%) | −7 | −6 | −6 | −7 | −7 |
|  | Volume change (%) | 9.78 | 8.82 | 8.31 | 12.42 | 12.16 |
| Heat resistance | Tensile strength change (%) | −13 | −12 | −12 | −11 | −13 |
|  | Elongation change (%) | −45 | −43 | −46 | −38 | −39 |
|  | Hardness change (%) | 10 | 9 | 10 | 11 | 11 |

TABLE 2-continued

| Friction properties | Dynamic friction coefficient | 3.8 | 3.5 | 3.5 | 2.4 | 2.0 |
|---|---|---|---|---|---|---|

| | | Comparative Example 3-1 | Comparative Example 3-2 | Example 1-1 | Example 1-2 | Example 2-1 |
|---|---|---|---|---|---|---|
| Non-stickiness | Tackiness (g) | 52 | 105 | 24 | 94 | 23 |
| Oil resistance | Tensile strength change (%) | −45 | −47 | −22 | −26 | −28 |
| | Elongation change (%) | −50 | −48 | −7 | −11 | −17 |
| | Hardness change (%) | −8 | −8 | −9 | −8 | −6 |
| | Volume change (%) | 13.07 | 12.27 | 5.27 | 5.7 | 3.62 |
| Heat resistance | Tensile strength change (%) | −13 | −14 | 8 | 7 | −3 |
| | Elongation change (%) | −39 | −41 | −25 | −27 | −25 |
| | Hardness change (%) | 11 | 12 | 11 | 11 | 11 |
| Friction properties | Dynamic friction coefficient | 1.9 | 1.7 | 1.6 | 1.5 | 1.2 |

| | | Example 2-2 | Example 3-1 | Example 3-2 | Example 4-1 | Example 4-2 |
|---|---|---|---|---|---|---|
| Non-stickiness | Tackiness (g) | 38 | 32 | 55 | 29 | 42 |
| Oil resistance | Tensile strength change (%) | −29 | −22 | −25 | −23 | −25 |
| | Elongation change (%) | −5 | −7 | −12 | −12 | −5 |
| | Hardness change (%) | −7 | −8 | −8 | −6 | −7 |
| | Volume change (%) | 3.28 | 5.23 | 5.62 | 3.54 | 3.21 |
| Heat resistance | Tensile strength change (%) | −6 | 7 | 7 | −2 | −5 |
| | Elongation change (%) | −26 | −26 | −27 | −24 | −25 |
| | Hardness change (%) | 10 | 11 | 10 | 9 | 10 |
| Friction properties | Dynamic friction coefficient | 1.0 | 1.5 | 1.5 | 1.3 | 1.1 |

INDUSTRIAL APPLICABILITY

Since the NBR composition of the present invention can produce an NBR molded article having excellent properties of non-stickiness, oil resistance, heat resistance, and low-friction properties, and can therefore be suitable for various applications in which the above properties are required. In particular, the composition is suitable as a material of products such as a sealing material, a packing material, a gasket, and an O-ring.

The invention claimed is:

1. An acrylonitrile-butadiene rubber composition comprising:
   an acrylonitrile-butadiene rubber (A); and
   a fluororesin (B),
   the fluororesin (B) being a perhalopolymer,
   the composition formed from a co-coagulated composition obtained by co-coagulating the acrylonitrile-butadiene rubber (A) and the fluororesin (B),
   wherein the fluororesin (B) is at least one selected from the group consisting of tetrafluoroethylene/hexafluoropropylene copolymer, tetrafluoroethylene/hexafluoropropylene/perfluoro(alkyl vinyl ether) copolymer, tetrafluoroethylene/perfluoro(alkyl vinyl ether) copolymer, polychlorotrifluoroethylene, and chlorotrifluoroethylene/tetrafluoroethylene copolymer,
   wherein a ratio by volume of acrylonitrile-butadiene rubber (A)/fluororesin (B) is 60/40 to 98/2.

2. The acrylonitrile-butadiene rubber composition according to claim 1,
   wherein the fluororesin (B) is dispersed as particles in the acrylonitrile-butadiene rubber (A), and the fluororesin (B) has an average dispersed particle diameter of 3 to 700 nm.

3. The acrylonitrile-butadiene rubber composition according to claim 1,
   wherein the acrylonitrile-butadiene rubber (A) contains 10% by mass or more of combined acrylonitrile.

4. An acrylonitrile-butadiene rubber molded article obtained by crosslinking the acrylonitrile-butadiene rubber composition according to claim 1.

5. A method for producing an acrylonitrile-butadiene rubber molded article, comprising the steps of:
   (I) co-coagulating an acrylonitrile-butadiene rubber (A) and a fluororesin (B) being a perhalopolymer to obtain an acrylonitrile-butadiene rubber composition, and
   (II) molding and crosslinking the acrylonitrile-butadiene rubber composition,
   wherein the fluororesin (B) is at least one selected from the group consisting of tetrafluoroethylene/hexafluoropropylene copolymer, tetrafluoroethylene/hexafluoropropylene/perfluoro(alkyl vinyl ether) copolymer, tetrafluoroethylene/perfluoro(alkyl vinyl ether) copolymer, polychlorotrifluoroethylene, and chlorotrifluoroethylene/tetrafluoroethylene copolymer,
   wherein a ratio by volume of acrylonitrile-butadiene rubber (A)/fluororesin (B) is 60/40 to 98/2.

6. An acrylonitrile-butadiene rubber molded article obtained by the production method according to claim 5.

* * * * *